(12) United States Patent
Zachrisson et al.

(10) Patent No.: US 12,234,866 B2
(45) Date of Patent: Feb. 25, 2025

(54) WHEEL DRIVE SHAFT ARRANGEMENT

(71) Applicant: VOLVO TRUCK CORPORATION, Gothenburg (SE)

(72) Inventors: Jan Zachrisson, Onsala (SE); Pär Öhrfeldt, Mölnlycke (SE); Ingemar Dagh, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 424 days.

(21) Appl. No.: 17/753,610

(22) PCT Filed: Sep. 26, 2019

(86) PCT No.: PCT/EP2019/076087
§ 371 (c)(1),
(2) Date: Mar. 9, 2022

(87) PCT Pub. No.: WO2021/058106
PCT Pub. Date: Apr. 1, 2021

(65) Prior Publication Data
US 2022/0325760 A1  Oct. 13, 2022

(51) Int. Cl.
*F16D 3/50* (2006.01)
*B60K 17/16* (2006.01)
(Continued)

(52) U.S. Cl.
CPC .............. *F16D 3/50* (2013.01); *B60K 17/165* (2013.01); *B60K 17/24* (2013.01); *F16D 3/33* (2013.01);
(Continued)

(58) Field of Classification Search
CPC ..... F16D 3/50; F16D 3/33; F16D 3/30; F16D 3/32; F16D 2300/18; B60K 17/165; B60K 17/24; Y10S 464/905
(Continued)

(56) References Cited

U.S. PATENT DOCUMENTS 3,057,174 A * 10/1962 Folley ....................... F16D 3/32
464/118
4,079,799 A    3/1978 Swan
(Continued)

FOREIGN PATENT DOCUMENTS

EP    0960761 A2    12/1999
GB    2015696 A     9/1979

OTHER PUBLICATIONS

International Search Report and Written Opinion dated Jun. 4, 2020 in corresponding International PCT Application No. PCT/EP2019/076087, 9 pages.
(Continued)

*Primary Examiner* — Greg Binda
(74) *Attorney, Agent, or Firm* — Venable LLP; Jeffri A. Kaminski

(57) ABSTRACT

A wheel drive shaft arrangement for a vehicle has a wheel drive shaft having a first and a second axial end, a constant-velocity joint provided at the first end, The constant-velocity joint has a first articulated joint member and a second articulated joint member which are drivingly and pivotally connected. The first articulated joint member is drivingly connected to the first end and the second articulated joint member is drivingly connectable to a driving member of the vehicle. The wheel drive shaft arrangement has a double centered universal joint provided at the second end. The double centered universal joint has a third articulated joint member drivingly connected to the second end, a fourth articulated joint member drivingly connectable to a wheel hub of the vehicle and an intermediate articulated joint member drivingly and pivotally connecting the third and fourth articulated joint members.

13 Claims, 3 Drawing Sheets

(51) Int. Cl.
  *B60K 17/24* (2006.01)
  *F16D 3/33* (2006.01)
  *F16D 3/30* (2006.01)
  *F16D 3/32* (2006.01)

(52) U.S. Cl.
  CPC ............... *F16D 3/30* (2013.01); *F16D 3/32* (2013.01); *F16D 2300/18* (2013.01); *Y10S 464/905* (2013.01)

(58) Field of Classification Search
  USPC .......... 464/23, 116, 118, 240; 180/256, 384
  See application file for complete search history.

(56) References Cited

U.S. PATENT DOCUMENTS

| | | | | |
|---|---|---|---|---|
| 4,273,209 | A | * | 6/1981 | Orain .................... B60K 17/30 464/905 |
| 4,697,662 | A | | 10/1987 | Zollmeyer et al. |
| 4,989,686 | A | * | 2/1991 | Miller ................. B60K 23/0808 |
| 2005/0073122 | A1 | | 4/2005 | LeBlanc et al. |

OTHER PUBLICATIONS

International Preliminary Report on Patentability dated Dec. 9, 2021 in corresponding International PCT Application No. PCT/EP2019/076087, 13 pages.

\* cited by examiner

WHEEL DRIVE SHAFT ARRANGEMENT

CROSS-REFERENCE TO RELATED APPLICATIONS

This application is a U.S. National Stage application of PCT/EP2019/076087, filed Sep. 26, 2019 and published on Apr. 1, 2021, as WO 2021/058106 A1, all of which is hereby incorporated by reference in its entirety.

TECHNICAL FIELD

The invention relates to a wheel drive shaft arrangement for a vehicle, to a wheel driving arrangement for a vehicle and/or to a vehicle.

The invention can be applied in heavy-duty vehicles, such as trucks, buses and construction equipment. Although the invention will be described with respect to heavy-duty trucks, the invention is not restricted to this particular vehicle, but may also be used in other vehicles such as light-weight trucks, articulated haulers, excavators, wheel loaders, and backhoe loaders.

BACKGROUND

Wheel driving arrangements for vehicles generally comprise a wheel hub which is drivingly connected to a drive shaft. The drive shaft may be connected to a differential gear which in turn may be connected to a propeller shaft. The power source for driving the propeller shaft may e.g. be an internal combustion engine (ICE) and/or an electric motor.

Further, the drive shaft may also generally be connected to the wheel hub and/or e.g. the differential gear via joints for allowing angle adjustments there between. One example of such a drive shaft may be found in the patent application EP 0 960 761 A2, which discloses a steering drive axle. The steering drive axle comprises a half-shaft portion which has a first end connected to a universal joint at the output from the differential gear, and a second end connected to a constant-velocity joint which is fixed for rotation with a wheel hub. The half-shaft portion is supported for rotation by a support means in the form of a tubular member. A ball and/or a roller bearing is interposed in-between the half-shaft portion and the tubular member.

Even though the aforementioned design may provide an acceptable power transfer to the wheel hub, there is still a strive towards developing improved wheel drive shaft arrangements and wheel driving arrangements.

SUMMARY

In view of the above, an object of the invention is to provide an improved wheel drive shaft arrangement for a vehicle and/or a wheel driving arrangement which at least in some aspect alleviates at least one of the drawbacks of the prior art, and/or which at least provides a useful alternative.

According to a first aspect of the invention, the object is achieved by a wheel drive shaft arrangement. According to a second aspect of the invention, the object is achieved by a wheel driving arrangement. According to a third aspect of the invention, the object is achieved by a vehicle.

According to the first aspect thereof, the object is achieved by a wheel drive shaft arrangement for a vehicle, comprising:
 a wheel drive shaft having a first and a second axial end,
 a constant-velocity joint provided at the first end, the constant-velocity joint comprising a first articulated joint member and a second articulated joint member which are drivingly and pivotally connected, wherein the first articulated joint member is drivingly connected to the first end and the second articulated joint member is drivingly connectable to a driving member. The wheel drive shaft arrangement further comprises:
 a double centered universal joint provided at the second end, the double centered universal joint comprising a third articulated joint member drivingly connected to the second end, a fourth articulated joint member drivingly connectable to a wheel hub of the vehicle and an intermediate articulated joint member drivingly and pivotally connecting the third and fourth articulated joint members.

By the provision of the present invention as disclosed herein, the wheel drive shaft arrangement may enable a more compact configuration. A more compact configuration has shown to be beneficial since there is commonly a restriction in available space at a vehicle wheel end. In fact, the inventors have realized that providing a double centered universal joint which is drivingly connectable to a wheel hub, i.e. the second end being an outer end, the configuration may be more compact at the outer end, in comparison to if e.g. a standard Rzeppa constant-velocity joint would be used at the outer end. Further, the double centered universal joint has also shown to be a reliable and robust joint, and may therefore provide an increased service life in comparison to other joints, such as the aforementioned Rzeppa constant-velocity joint. The double centered universal joint has also shown to provide improved torque capacity and to allow for larger wheel angles. Further, the inventors have also realized that providing a constant-velocity joint drivingly connectable to a driving member, i.e. the first end being an inner end, may result in that less forces and rotational torque is transferred into the driving member. Thereby, the service life of for example bearings in the driving member, which may be a differential gear, may be increased. Hence, in view of the above effects, an improved wheel drive shaft arrangement is provided.

Double centered universal joints and a constant-velocity joints are joints which are known to a person skilled in the art. A constant-velocity joint may be defined as a joint which allows a drive shaft to transmit power through a variable angle, at constant rotational speed. A double centered universal joint, also known as a double centered Cardan joint, may be defined as a joint which allows a drive shaft to transmit power through a variable angle, at constant rotational speed, and where an input angle adjustment of the joint will cause a corresponding output angle adjustment of the joint during rotation.

Optionally, the first and second articulated joint members may be arranged to rotate about respective rotational center lines, which rotational center lines intersect each other in an intersection point, wherein the constant-velocity joint is adapted so that the intersection point is axially displaceable. Thereby the constant-velocity joint can accommodate axial shaft displacements during operation. This may for example be beneficial in that the wheel drive shaft may not be arranged to compensate for axial displacements, such as by use of a wheel drive shaft having a telescope-configuration. Hence, a less complicated wheel drive shaft may be used, reducing the risk of failures of e.g. a telescope arrangement during use. Also the cost for the wheel drive shaft may be reduced.

Optionally, the constant-velocity joint may further comprise a plurality of balls, or a plurality of members each having a contact surface formed as a portion of a sphere, interposed in-between the first and second articulated joint members. Thereby torque can be reliably transferred between the first and second articulated joint members. The plurality of balls, or the plurality of members each having a contact surface formed as a portion of a sphere, may preferably be provided in grooves in the first and second articulated joint members. The plurality of balls, or the plurality of members each having a contact surface formed as a portion of a sphere, may further be arranged to transmit torque via respective point contacts between the first and second articulated joint members.

Optionally, the constant-velocity joint may be a plunging joint. A plunging joint is known for its capability to transmit power through a variable angle, at constant rotational speed, and of its capability to accommodate axial shaft displacements during operation. Further, by using a plunging joint, the effective length of the wheel drive shaft between the plunging joint and the double centered universal joint may be increased. This can be achieved since the plunging joint is relatively compact in its axial extension. The increased effective length has shown to be beneficial for the wheel drive shaft arrangement's service life.

Optionally, the double centered universal joint may comprise one or more roller bearings, preferably needle roller bearings, for pivoting the third, fourth and intermediate joint members with respect to each other. Providing bearings having rollers have shown beneficial in that it may transfer larger loads/torques, and also rollers may be advantageous in that it may affect the service life of lubricant used for the joint. The lubricant may for example be grease.

Optionally, the double centered universal joint may comprise a centering member provided inside the intermediate articulated joint member, which centering member is connected to the third and fourth articulated joint members and adapted so that rotational center lines of the respective third and fourth articulated joint members are centered in a substantially fixed intersection point during use. By use of the aforementioned centering member, an input angle adjustment of the joint will cause a corresponding output angle adjustment of the joint during rotation. Thereby radial shaft displacements of the wheel drive shaft may be avoided or a least reduced, and this has shown to be beneficial in that additional support members for supporting the wheel drive shaft may not be required. For example, there may not be a need for radially supporting the wheel drive shaft by use of e.g. rolling bearings, comprising ball bearings and/or roller bearings. Hence, fewer components may be required for installing the wheel drive shaft arrangement into a vehicle.

Optionally, the centering member may comprise a male portion connected to one of the third and fourth articulated joint members and a female portion connected to the other one of the third and fourth articulated joint members, wherein the male portion is adapted to move inside the female portion during use so that the rotational center lines of the respective third and fourth articulated joint members are centered in the substantially fixed intersection point.

Optionally, the wheel drive shaft may have a constant nonadjustable axial length. In fact, by use of the configuration as disclosed herein, the wheel drive shaft's length may not be axially adjustable, thereby reducing the cost for the wheel drive shaft. Further, by having a nonadjustable axial length, the wheel drive shaft's diameter may be reduced, thereby providing a more compact drive shaft. In fact, there is no need of e.g. a telescope configuration.

Optionally, the wheel drive shaft arrangement may further comprise means for measuring at least one of torque and rotational speed of the wheel drive shaft during use.

Optionally, the double centered universal joint may be adapted so that an angle adjustment between the third and fourth articulated joint members caused by suspension movements and/or steering angle adjustments during use transfers an axial displacement to the wheel drive shaft and to the first end of the wheel drive shaft.

According to the second aspect thereof, the object is achieved by a wheel driving arrangement for a vehicle, comprising:
the wheel drive shaft arrangement according to any one of the embodiments of the first aspect of the invention,
at least one driving member drivingly connected to the second articulated joint member, and
a wheel hub drivingly connected to the fourth articulated joint member.

Advantages and effects provided by the second aspect of the invention are largely analogous to the advantages and effects provided by the wheel drive shaft arrangement according to the embodiments of the first aspect of the invention. It shall also be noted that all embodiments of the second aspect of the invention are applicable to and combinable with all embodiments of the first aspect of the invention and vice versa.

Optionally, the wheel driving arrangement may be adapted to provide steering for the vehicle. Still optionally, the wheel drive shaft may only be supported by the constant-velocity joint and the double centered universal joint. It has namely been found that the above mentioned configuration provides that support bearings may not be used since radial shaft displacements will be avoided or at least reduced. Thereby a lower weight configuration may be provided, which may result in improved fuel/energy economy, reduced environmental impact, reduced cost etc.

According to the third aspect thereof, the object is achieved by a vehicle comprising at least one wheel drive shaft arrangement according to any one of the embodiments of the first aspect of the invention and/or at least one wheel driving arrangement according any one of the embodiments of the second aspect of the invention.

Advantages and effects provided by the third aspect of the invention are largely analogous to the advantages and effects provided by the wheel drive shaft arrangement according to the embodiments of the first aspect of the invention and as provided by the wheel driving arrangement according to the embodiments of the second aspect of the invention. It shall also be noted that all embodiments of the third aspect of the invention are applicable to and combinable with all embodiments of the first and second aspects of the invention and vice versa.

BRIEF DESCRIPTION OF THE DRAWINGS

With reference to the appended drawings, below follows a more detailed description of embodiments of the invention cited as examples.

In the drawings.

Figure 1:
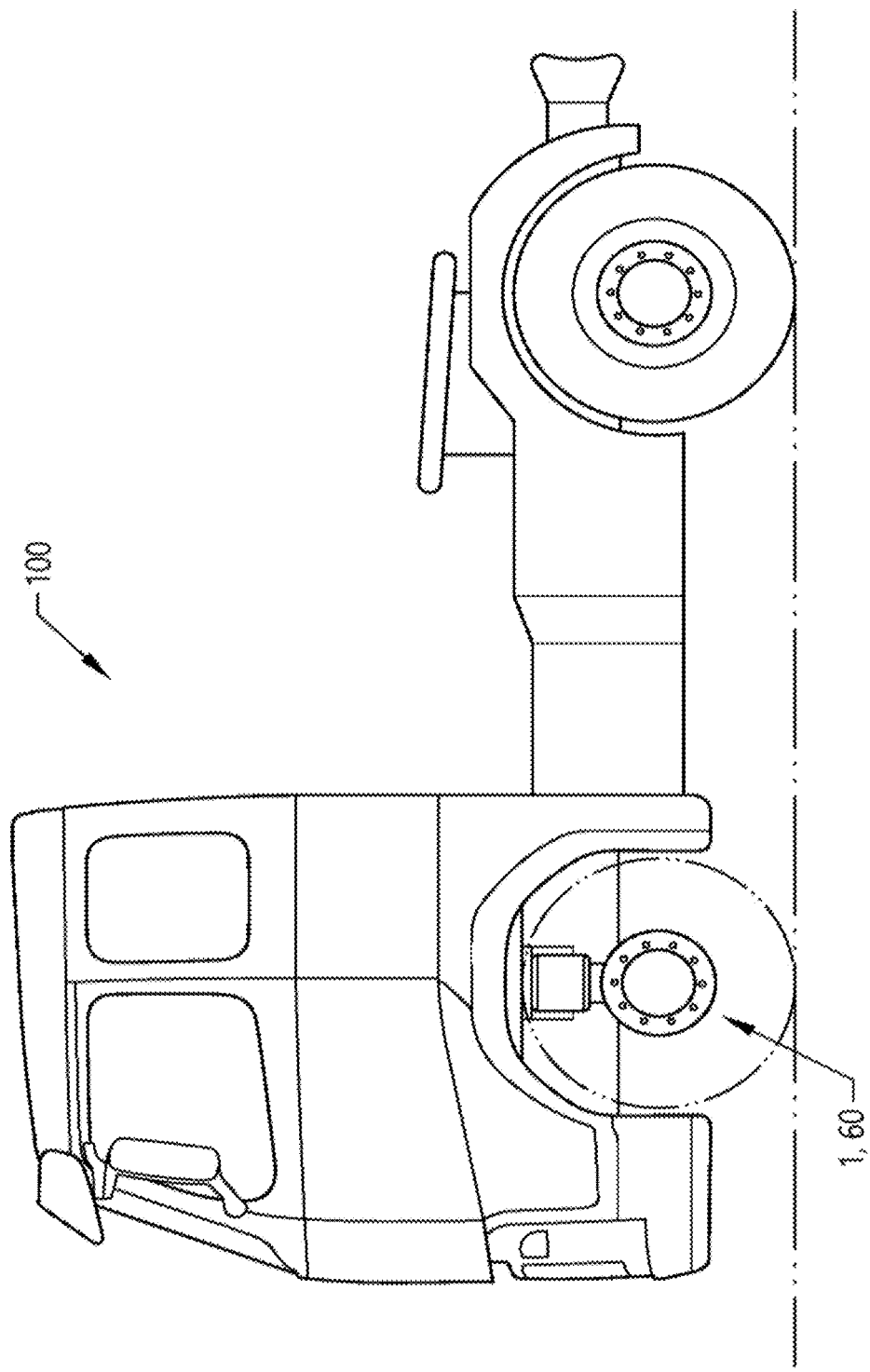
FIG. 1 shows a side view of a vehicle in the form of a truck according to an example embodiment of the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE
EMBODIMENTS OF THE INVENTION

In FIG. 1, a vehicle in the form of a truck 100 is shown. The truck 100 comprises a wheel drive shaft arrangement 1 as e.g. shown in FIG. 2 forming part of a wheel driving arrangement 60 as e.g. shown in FIG. 3. The wheel drive shaft arrangement 1 and the wheel driving arrangement 60 are here provided at a front wheel end of the truck 100. It shall however be understood that the wheel drive shaft arrangement 1 and/or the wheel driving arrangement 60 may be provided also in other positions, such as in one or more rearward positions. The wheel drive shaft arrangement 1 may be drivingly connected to one or more electric motors (not shown) and/or to an internal combustion engine. Even though a truck 100 is shown it shall be understood that the present invention can also be used in other types of vehicles, such as buses, construction equipment vehicles etc.

Figure 2:
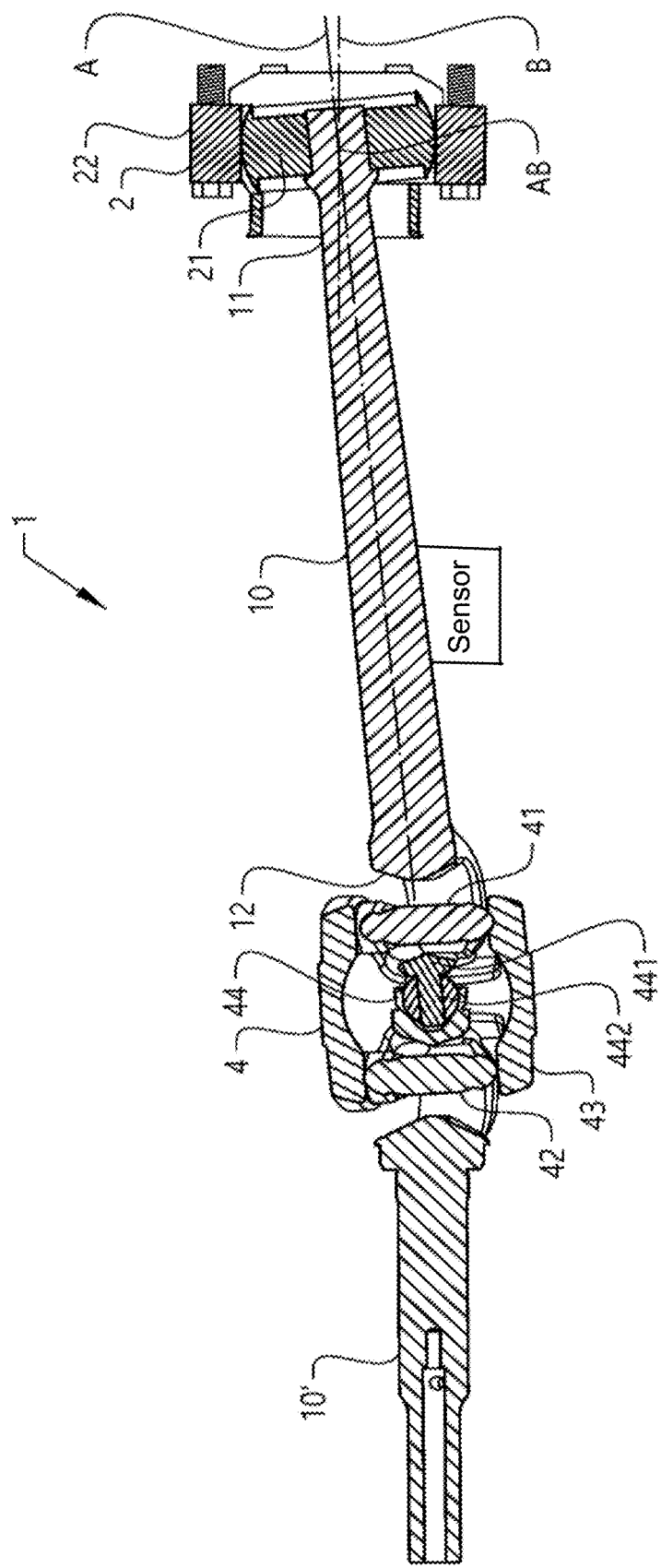
FIG. 2 shows a sectional view of a wheel drive shaft arrangement according to an example embodiment of the present invention.

FIG. 2 shows a sectional view of a wheel drive shaft arrangement 1 for a vehicle. The wheel drive shaft arrangement 1 comprises a wheel drive shaft 10 which has a first axial end 11 and a second axial end 12. The section is a sectional plane defined by a rotational axis A of the wheel drive shaft 1. The wheel drive shaft arrangement 1 further comprises a constant-velocity joint 2 provided at the first end 11, wherein the constant-velocity joint comprises a first articulated joint member 21 and a second articulated joint member 22 which are drivingly and pivotally connected. The first articulated joint member 21 is drivingly connected to the first end 11 and the second articulated joint member 22 is drivingly connectable to a driving member 3 (see FIG. 3) of the vehicle 100.

The wheel drive shaft arrangement 1 further comprises a double centered universal joint 4 provided at the second end 12. The double centered universal joint 4 comprises a third articulated joint member 41 which is drivingly connected to the second end 12, a fourth articulated joint member 42 which is drivingly connectable to a wheel hub 5 (see FIG. 3) of the vehicle 100 and an intermediate articulated joint member 43 which is drivingly and pivotally connecting the third and fourth articulated joint members, 41 and 42. The fourth articulated joint member 42 is in the shown embodiment drivingly connectable to the wheel hub 5 via a shaft member 10'.

Further, as shown in FIG. 2, the first and second articulated joint members, 21 and 22, may be arranged to rotate about respective rotational center lines, A and B, respectively, which rotational center lines intersect each other in an intersection point AB, wherein the constant-velocity joint 2 is adapted so that the intersection point AB is axially displaceable. Hence, the first and second articulated joint members, 21 and 22, are arranged so that they can be relatively axially displaced. Thereby the constant-velocity joint 2 can accommodate axial displacements of the wheel drive shaft 10 caused by e.g. an angle adjustment of the double centered universal joint 4. The constant-velocity joint 2 as shown in FIG. 2 is in the form of a plunging joint which is configured to be able to accommodate axial displacements. More particularly, the shown constant-velocity joint 2 in FIG. 2 is a tripod plunging joint, which may comprise spherical rollers (not shown), i.e. members each having a contact surface formed as a portion of a sphere, which may be attached to needle roller bearings.

The double centered universal joint 4 comprises needle roller bearings (not shown) for pivoting the third, fourth and intermediate joint members, 41-43, with respect to each other. Moreover, the double centered universal joint 4 comprises a centering member 44 provided inside the intermediate articulated joint member, which centering member 44 is connected to the third and fourth articulated joint members, 41 and 42, and adapted so that rotational center lines of the respective third and fourth articulated joint members are centered in a substantially fixed intersection point during use.

The centering member as shown in FIG. 2 comprises a male portion 441 connected to the third articulated joint member 41 and a female portion 442 connected to the fourth articulated joint member 42, wherein the male portion 441 is adapted to move inside the female portion 442 during use so that the rotational center lines of the respective third and fourth articulated joint members are centered in the substantially fixed intersection point. The female portion is sphere-shaped, allowing it to pivot about the joint's intersection point.

Further, the wheel drive shaft 10 as shown in FIG. 2 has a constant nonadjustable axial length. Hence, a more cost-effective configuration is provided, in comparison to e.g. a design having an adjustable telescope-shaft.

The double centered universal joint 4 is adapted so that an angle adjustment between the third and fourth articulated joint members, 41 and 42, which are caused by suspension movements and/or steering angle adjustments during use transfers an axial displacement to the wheel drive shaft 10 and to the first end 11 of the wheel drive shaft 10.

Figure 3:
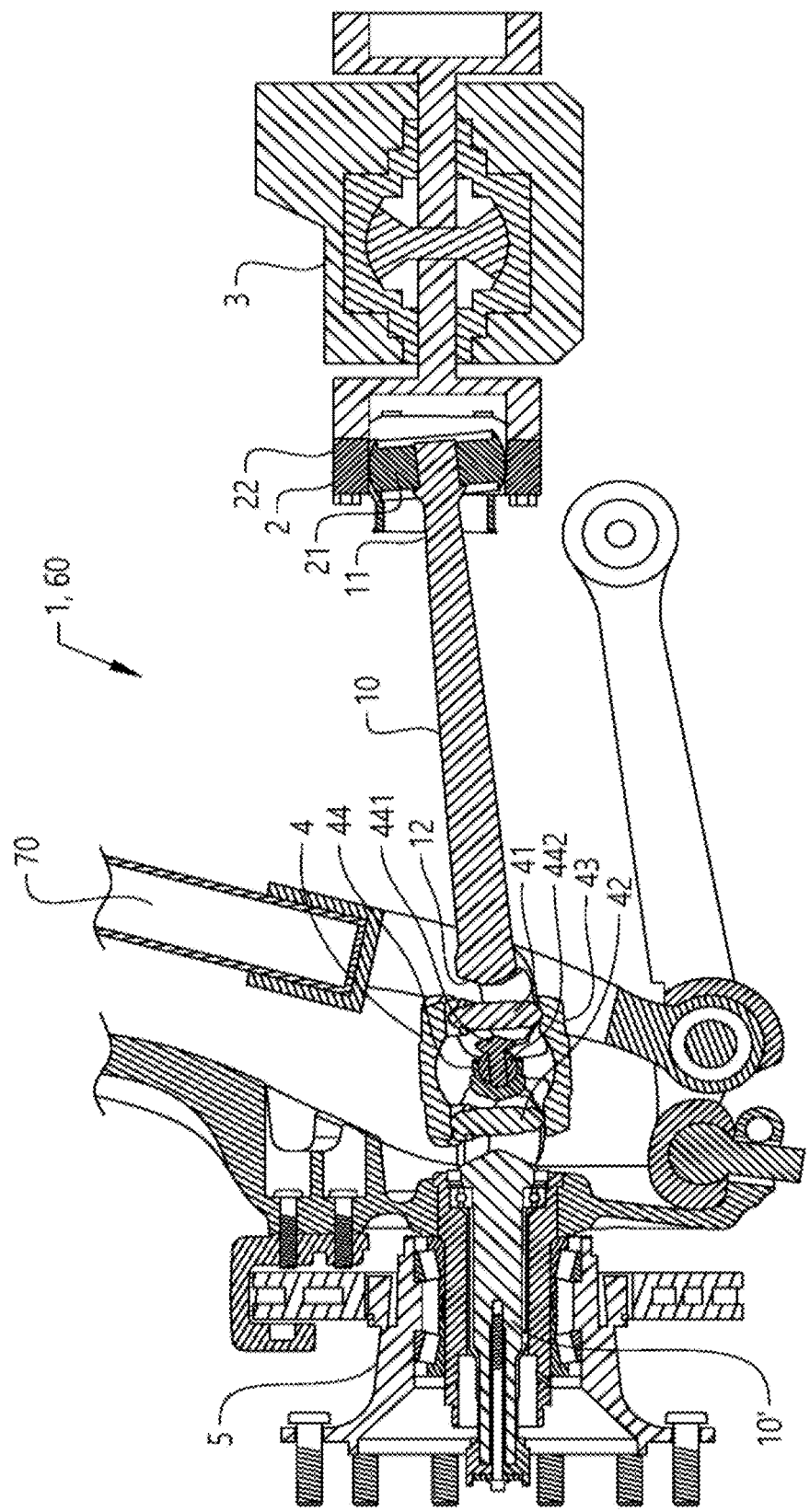
FIG. 3 shows a wheel driving arrangement according to an example embodiment of the present invention.

Now, with respect to FIG. 3, a sectional view of a wheel driving arrangement 60 for a vehicle 100 is shown. The section is a sectional plane defined by the rotational axis A of the wheel drive shaft 1. The wheel driving arrangement 60 comprises the wheel drive shaft arrangement 1 as shown in FIG. 2. It further comprises a driving member 3, which in this embodiment is a differential gear, which is drivingly connected to the second articulated joint member 22, and a wheel hub 5 which is drivingly connected to the fourth articulated joint member 42 via the shaft member 10'. The wheel driving arrangement 60 as shown in FIG. 3 is adapted to provide steering for the vehicle and is a front steering wheel driving arrangement. As already mentioned, the wheel driving arrangement 60 may also be used in other positions of a vehicle. By the provision of the present invention, the wheel drive shaft 10 is only supported by the constant-velocity joint 2 and the double centered universal joint 4, i.e. there are no bearings or the like for radially supporting the wheel drive shaft 10. A radial direction with respect to the wheel drive shaft 10 as used herein means a direction which is perpendicular to the axial direction of the wheel drive shaft 10. The wheel driving arrangement 60 as shown in FIG. 3 is further connected to a suspension member 70.

The wheel drive shaft arrangement and/or the wheel driving arrangement 60 may further comprise means (not shown) for measuring at least one of torque and rotational speed of the wheel drive shaft 10 during use. For example, the means may comprise a sensor provided on a stationary member and an encoder which is rotatable with the wheel drive shaft 10, wherein the sensor is adapted to detect rotational movement which is indicative of rotational speed and/or acceleration of the wheel drive shaft 10.

It is to be understood that the present invention is not limited to the embodiments described above and illustrated in the drawings; rather, the skilled person will recognize that many changes and modifications may be made within the scope of the appended claims.

The invention claimed is:

1. A wheel drive shaft arrangement for a vehicle, comprising:
   a wheel drive shaft having a first and a second axial end,
   a constant-velocity joint provided at the first end, the constant-velocity joint comprising a first articulated joint member and a second articulated joint member which are drivingly and pivotally connected, characterized in that the first articulated joint member is drivingly connected to the first end and the second articulated joint member is drivingly connectable to a driving member of the vehicle, and wherein the wheel drive shaft arrangement further comprises:
   a double centered universal joint provided at the second end, the double centered universal joint comprising a third articulated joint member drivingly connected to the second end, a fourth articulated joint member drivingly connectable to a wheel hub of the vehicle and an intermediate articulated joint member drivingly and pivotally connecting the third and fourth articulated joint members, wherein the double centered universal joint comprises a centering member provided inside the intermediate articulated joint member, which centering member is connected to the third and fourth articulated joint members and adapted so that rotational center lines of the respective third and fourth articulated joint members are centered in a substantially fixed intersection point during use, wherein the centering member comprises a male portion connected to one of the third and fourth articulated joint members and a female portion connected to the other one of the third and fourth articulated joint members, wherein the male portion is adapted to move inside the female portion during use so that the rotational center lines of the respective third and fourth articulated joint members are centered in the substantially fixed intersection point.

2. The wheel drive shaft arrangement according to claim 1, wherein the first and second articulated joint members are arranged to rotate about respective rotational center lines, which rotational center lines intersect each other in an intersection point, wherein the constant-velocity joint is adapted so that the intersection point is axially displaceable.

3. The wheel drive shaft arrangement according to claim 1, wherein the constant-velocity joint further comprises a plurality of balls, or a plurality of members each having a contact surface formed as a portion of a sphere, interposed in-between the first and second articulated joint members.

4. The wheel drive shaft arrangement according to claim 1, wherein the constant-velocity joint is a plunging joint.

5. The wheel drive shaft arrangement according to claim 1, wherein the double centered universal joint comprises one or more roller bearings for pivoting the third, fourth and intermediate joint members with respect to each other.

6. The wheel drive shaft arrangement according to claim 1, wherein the wheel drive shaft has a constant nonadjustable axial length.

7. The wheel drive shaft arrangement according to claim 1, further comprising means for measuring at least one of torque and rotational speed of the wheel drive shaft during use.

8. The wheel drive shaft arrangement according to claim 1, wherein the double centered universal joint is adapted so that an angle adjustment between the third and fourth articulated joint members caused by suspension movements and/or steering angle adjustments during use transfers an axial displacement to the wheel drive shaft and to the first end of the wheel drive shaft.

9. A wheel driving arrangement for a vehicle, comprising:
   the wheel drive shaft arrangement according to claim 1,
   at least one driving member drivingly connected to the second articulated joint member,
   a wheel hub drivingly connected to the fourth articulated joint member.

10. The wheel driving arrangement according to claim 9, wherein the wheel driving arrangement is adapted to provide steering for the vehicle.

11. The wheel driving arrangement according to claim 9, wherein the wheel drive shaft is only supported by the constant-velocity joint and the double centered universal joint.

12. The wheel driving arrangement according to claim 9, wherein the driving member is a gear.

13. A vehicle comprising at least one wheel drive shaft arrangement according to claim 1.

* * * * *